US011357019B2

United States Patent
Tietsch et al.

(10) Patent No.: US 11,357,019 B2
(45) Date of Patent: *Jun. 7, 2022

(54) TELECOMMUNICATION ARRANGEMENT AND PROCEDURES TO ESTABLISH A RTC CONNECTION BETWEEN A FIRST AND SECOND ENDPOINT

(71) Applicant: RINGCENTRAL, INC., Belmont, CA (US)

(72) Inventors: Michael Tietsch, Kaufering (DE); Karl Klaghofer, Munich (DE)

(73) Assignee: RINGCENTRAL, INC., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,921

(22) Filed: Sep. 15, 2020

(65) Prior Publication Data

US 2020/0413419 A1    Dec. 31, 2020

Related U.S. Application Data

(63) Continuation of application No. 16/580,109, filed on Sep. 24, 2019, now Pat. No. 10,813,105, which is a
(Continued)

(30) Foreign Application Priority Data

Dec. 16, 2014   (DE) .......................... 102014018873.6

(51) Int. Cl.
*H04W 4/00*   (2018.01)
*H04W 72/10*  (2009.01)
(Continued)

(52) U.S. Cl.
CPC ......... *H04W 72/10* (2013.01); *H04L 61/2575* (2013.01); *H04L 61/2589* (2013.01);
(Continued)

(58) Field of Classification Search
CPC ................ H04W 72/10; H04W 72/085; H04L 61/2575; H04L 61/2589; H04L 65/80;
(Continued)

(56) References Cited

U.S. PATENT DOCUMENTS 6,609,002 B1 * 8/2003 Krishnamurthy .... H04B 7/1856
                                                          455/428
8,315,271 B2    11/2012 Nanda et al.
(Continued)

FOREIGN PATENT DOCUMENTS

| CN | 101473624 A | 7/2009 |
| CN | 102082596 A | 6/2011 |
| WO | WO 2013043308 A1 | 3/2013 |

OTHER PUBLICATIONS

Chinese Search Report for Chinese Patent Application Serial No. 2015109431036.
(Continued)

*Primary Examiner* — Chuong T Ho
(74) *Attorney, Agent, or Firm* — Finnegan, Henderson, Farabow, Garrett & Dunner LLP

(57) ABSTRACT

A telecommunication system and a method for generating a real time connection between a first endpoint and a second endpoint in an IP network using an ICE STUN connectivity check follow a procedure that includes the steps of generating a list of possible connection paths between the first endpoint and the second endpoint, establishing a respective priority for each possible connection path included in the list, and generating the real time connection between the first endpoint and the second endpoint. During this procedure first there is an attempt to generate the real time connection using the highest-priority connection path. If this is not possible, then the system attempts to establish the real connection using the connection path with the next highest priority, until the real time connection is actually estab-
(Continued)

lished. Furthermore, for each possible connection path, its respective quality-of-service value is determined and is considered when establishing its priority on the list.

17 Claims, 4 Drawing Sheets

Related U.S. Application Data continuation of application No. 15/838,714, filed on Dec. 12, 2017, now Pat. No. 10,455,595, which is a continuation of application No. 14/960,649, filed on Dec. 7, 2015, now Pat. No. 9,883,521.

(51) Int. Cl.
*H04L 65/1069* (2022.01)
*H04W 72/08* (2009.01)
*H04L 61/2575* (2022.01)
*H04L 61/2589* (2022.01)
*H04L 65/80* (2022.01)
*H04L 61/2514* (2022.01)

(52) U.S. Cl.
CPC .......... *H04L 65/1069* (2013.01); *H04L 65/80* (2013.01); *H04W 72/085* (2013.01); *H04L 61/2514* (2013.01)

(58) Field of Classification Search
CPC ............. H04L 65/1069; H04L 61/2514; H04L 12/4641; H04L 12/4695; H04L 43/0811
USPC .................................................. 370/329, 330
See application file for complete search history.

(56) References Cited

U.S. PATENT DOCUMENTS

| | | | |
|---|---|---|---|
| 8,848,543 B2 | 9/2014 | Rodrig | |
| 9,264,459 B2 | 2/2016 | Mosko et al. | |
| 9,883,521 B2* | 1/2018 | Tietsch | H04L 61/2575 |
| 10,455,595 B2* | 10/2019 | Tietsch | H04L 65/80 |
| 10,813,105 B2* | 10/2020 | Tietsch | H04L 65/80 |
| 2005/0270975 A1* | 12/2005 | Meylan | H04L 1/1854 |
| | | | 370/229 |
| 2006/0227801 A1 | 10/2006 | Nanda et al. | |
| 2006/0239184 A1 | 10/2006 | Moore | |
| 2007/0133516 A1 | 6/2007 | Stein | |
| 2010/0020681 A1* | 1/2010 | Nakashima | H04L 47/2441 |
| | | | 370/437 |
| 2010/0103845 A1 | 4/2010 | Ulupinar et al. | |
| 2010/0131617 A1 | 5/2010 | Osborne et al. | |
| 2010/0293297 A1 | 11/2010 | Perumal et al. | |
| 2012/0057464 A1* | 3/2012 | Nakata | H04L 45/00 |
| | | | 370/237 |
| 2012/0158861 A1 | 6/2012 | Mosko et al. | |
| 2012/0158862 A1 | 6/2012 | Mosko et al. | |
| 2012/0158974 A1 | 6/2012 | Perumal et al. | |
| 2014/0006604 A1 | 1/2014 | Wegger et al. | |
| 2014/0105372 A1 | 4/2014 | Nowack et al. | |
| 2014/0136718 A1 | 5/2014 | Menezes et al. | |
| 2015/0103989 A1 | 4/2015 | Nowack et al. | |
| 2015/0350599 A1 | 12/2015 | Yang et al. | |
| 2016/0043932 A1* | 2/2016 | Karthikeyan | H04L 12/18 |
| | | | 370/390 |
| 2016/0066352 A1 | 3/2016 | Yang et al. | |
| 2016/0094586 A1* | 3/2016 | Gunnalan | H04L 65/1069 |
| | | | 709/228 |
| 2016/0094589 A1 | 3/2016 | Gunnalan et al. | |
| 2016/0094591 A1 | 3/2016 | Moore et al. | |
| 2016/0182735 A1 | 6/2016 | Nowack et al. | |
| 2016/0218963 A1* | 7/2016 | Nauck | H04L 41/16 |
| 2016/0269493 A1 | 9/2016 | Nasielski et al. | |
| 2017/0026263 A1* | 1/2017 | Gell | H04L 47/822 |

OTHER PUBLICATIONS

Rosenberg, J.: Interactive Connectivity Establishment (ICE): A Protocol for Network Address Translator (NAT) Traversal for Offer/Answer Protocols. In: IETF-RFC 5245, Apr. 2010, S. 1-117.

* cited by examiner

PRIOR ART

TELECOMMUNICATION ARRANGEMENT AND PROCEDURES TO ESTABLISH A RTC CONNECTION BETWEEN A FIRST AND SECOND ENDPOINT

CROSS-REFERENCE TO RELATED APPLICATIONS

This application is a continuation application of, and claims the benefit of priority to U.S. patent application Ser. No. 16/580,109, filed on Sep. 24, 2019, which is a continuation application of, and claims the benefit of priority to U.S. patent application Ser. No. 15/838,714, filed on Dec. 12, 2017, which is a continuation application of, and claims the benefit of priority to U.S. patent application Ser. No. 14/960,649, filed on Dec. 7, 2015, which claims priority to German Patent Application No. 102014018873.6 filed on Dec. 16, 2014, the entire contents of all of which are incorporated herein by reference.

FIELD OF INVENTION

This invention relates to a method for generating a real time connection between a first endpoint and a second endpoint as well as a corresponding telecommunications system.

BACKGROUND OF THE INVENTION

A typical telecommunication system for real-time communication, or RTC, is based on standardized multimedia technology designated as RTCWeb or WebRTC (the term "WebRTC" will be used herein in place of either designation) by the IETF (Internet Engineering Taskforce) and W3C (World Wide Web Consortium), or generally called RTC, in which a number of similarly standardized protocols are used. The ICE (Interactive Connectivity Establishment, RFC 5245) method used to determine the optimal RTC payload connection in turn uses the STUN (Session Traversal Utilities for NAT (Network Address Translation), RFC 5389) protocol to run so-called "connectivity checks." These checks determine whether the route in question could in principle be used for the desired payload connection.

In VoIP (Voice-over-Internet-Protocol), the endpoints of a real-time connection (RTP/RTCP) are connected to each other as directly as possible, i.e., without interconnected servers. However, the shortage of IPv4 addresses has led to the fact that in many cases NAT or NAPT (Network Address & Port Translation) is used between Intranet and Internet. This makes it impossible to establish direct contact from the Internet to an Intranet endpoint without taking special measures. This involves ICE (Interactive Connectivity Establishment), which in the VoIP example works together with the SIP signaling protocol and the STUN and TURN (an extension of STUN) protocols. Because ICE does not require any presets for possible connections, as part of its operation all connection candidates are first determined by the endpoints and then simply tested (go/no go, the STUN-based "connectivity check"). These checks are done using a checklist. The list contains all candidates, sorted by priority (from the presumed best connection at the top to the presumed least suitable connection, e.g., via TURN server, at the bottom). The algorithm for establishing the priorities is described in the ICE RFC, but contains only fixed rules that do not account for the current network load or any network interferences.

Because it is important in this description to understand the various scenarios described in the standard, these scenarios are briefly outlined below. The connectivity checks are performed according to the standard in precisely this (priority) sequence (from top to bottom), as shown in FIGS. 1-3.

Next comes the question of why it should be possible for a direct host-host connection (see FIG. 1) to be of poorer quality than one of the other two connections. The answer lies in the fact that the scenarios illustrated above show only the logical structures, without considering the physical characteristics. FIG. 5 (logical network view on top and two physical expressions underneath) demonstrates this concept; although it is logically the same configuration, the quality of the connection established through the two VPN routers (R1, R2) differs significantly from the direct connection (via Ethernet) shown on the left. The connection through the two VPN routers generally has noticeably poorer quality-of-service values.

A VPN can similarly be used in all scenarios, without it being known to the ICE method. Thus, it is always a good idea to consider quality of service in the priority allocation.

However, at present only a few predefined criteria are used as described to decide which route is finally chosen for the payload (i.e., user data). The quality-of-service aspects that are important in the RTC (real-time communication) environment still are often not considered.

At present, with STUN only a "go/no go" test is performed ("connectivity check," i.e., a test message either does or does not make a complete circuit from sender to STUN server and back again). In particular, QoS (quality of service) aspects that are important for real-time applications are not considered. Of course, in ICE the various alternatives (called candidates) are assigned priorities that should contribute to quality improvement (and, if applicable, cost reduction), but strictly speaking are based on assumptions or guidelines, as shown in the following examples of prioritizing criteria:

IPv6 before IPv4, i.e. strategic guideline;
Direct connection (with no address conversion) before NAT; this is OK with the IP technology, but does not allow any QoS statements;
NAT before TURN (relay); TURN servers are potential bandwidth bottlenecks, and the assumption is therefore understandable, but reliable QoS statements are also not possible.

The aforementioned STUN connectivity checks are performed in the sequence established by the preceding prioritization. However, the prioritization itself is not influenced by either STUN or other QoS-related criteria.

In summary, the standard IETF ICE procedures, e.g., for WebRTC or SIP systems, test only the basic connectivity ("STUN connectivity checks") of the offered RTC payload candidate address pairs for the (ICE) communication endpoints (clients, application servers). However, there is no function for considering the QoS characteristics of the various candidate payload paths.

SUMMARY OF THE INVENTION

The invention is intended to eliminate the aforementioned disadvantage when generating an RTC connection and to generate more efficient RTC connections in the future.

This objective is achieved with the method, the computer program product or computer program, the machine-readable data carrier with a computer program stored on it and the telecommunication system that are here described and claimed.

According to the invention, the (computer-implemented) method for generating an RTC connection between a first endpoint and a second endpoint in an IP network, in which the known STUN connectivity check procedures of an ICE method are used, is executed as follows: First, a list of possible connection paths-even all possible connection paths-between the first endpoint and the second endpoint is generated. Then, for each of the possible connection paths on the list (also called candidates), a respective priority is established that determines the sequence for the successive connectivity checks in the STUN process, to see whether a connection between the first endpoint and the second endpoint can be established using that particular connection path. Next, the RTC connection between the first endpoint and the second endpoint is established according to the determined priority, wherein the system first attempts to establish the RTC connection using the connection path with the highest priority. If this succeeds, no further steps are necessary. However, if it fails for any reason, then the system attempts to establish the RTC connection using the connection path with the next highest priority. These attempts continue, following the determined or established priority sequence, until an RTC connection is finally established.

The invention is characterized in that, for establishing the respective priority, not only are the criteria known to date applied, but also the respective quality-of-service value is determined for each possible connection path and is included in the list used to determine the priority of that connection path.

Using this process means that, by using available statistics on the respective quality of service (also designated as QoS), the quality-of-service or QoS values, which are sometimes critical for real-time applications, are considered, making it possible to establish corresponding real-time connections, or RTC connections, more efficiently.

Considering QoS in ICE procedures (STUN connectivity checks) according to the invention allows the likely best ICE address pair from a QoS standpoint to be tested first. Unnecessary and time-consuming STUN connectivity checks can thus be avoided, which leads to shorter real-time connection establishment times, less network load, and the selection of the ICE candidate pair (connection path) with the best QoS characteristics (compared to the alternatives).

According to one advantageous version of the invented method, the first endpoint also transmits the quality-of-service values for the possible connection paths between the first endpoint and the second endpoint to other endpoints by using STUN messages. Because here the term "first endpoint" is not intended to indicate a limitation to any particular endpoint, all endpoints therefore transfer knowledge about quality-of-service values to the remaining endpoints. In other words, the QoS data for each possible connection path (also called ICE candidate pairs) are exchanged back and forth in STUN messages. In this way, each endpoint adds the corresponding information from its partners to its own QoS statistics. Not only the QoS data for previous "real" connections, but also the results of the connectivity checks performed for the present call to be placed (which can also be called an RTC connection), will be included in the current ICE candidate selection. The QoS data exchanged via STUN connectivity checks are also integrated in QoS statistical data for the ICE endpoint and can be considered for future RTC connections or calls. This is especially advantageous when no past QoS data for the ICE candidate pair are available yet at that terminal.

According to one embodiment of the invented method, quality-of-service values known only to network infrastructure elements (such as routers) but not to the endpoints are inserted into STUN connectivity check messages (typically "request" and "response") in order to send information to the endpoints that otherwise (i.e., without the invented method) would not be available to them. In this case, preferably the network infrastructure elements themselves perform this insertion, providing their own QoS knowledge. In this way, for example, a router can insert its available information—that the router queue currently has a packet loss rate of 15% for a "video" type of payload or user data connection in that direction, which requires so-called Traffic Shaping—into the STUN response message. This can be taken into account at the endpoint acting as the so-called controlling ICE client endpoint, which receives the STUN response message, and also considered for the ICE candidate pair selection, for the video connection to be established (also called a video call), and for updating the QoS statistics at the affected endpoint for subsequent calls or RTC connection. This can further improve the efficiency of establishing ICE connections.

It is advantageous to define groups of endpoints whose connections can be expected to have the same quality of service value, so that preferably each group corresponds to at least one or part of one subnet for the affected endpoint. In other words, this means that preferably all members of a group would be located in the same subnet. This permits the advantages of reducing data volume and making assumptions about the connection's quality of service on endpoints with which no connection has existed until now, as long as they are members in a group with a connection whose quality of service is known. If the determined quality-of-service values for connection paths to various endpoints within a group are different, these quality-of-service values preferably are averaged, wherein the current values are considered or weighted more heavily.

According to one embodiment, a central point of the IP network is used to send its available quality-of-service values to the controlling endpoint (also called an ICE controlling endpoint). Because such a central point has a higher traffic volume, "better" QoS data are received for use in the predictions. This type of central point can be, for example, a gateway, a session-border controller, or a media server (such as a server-based real-time application).

It is advantageous if the determined quality-of-service values for the possible connection paths or candidate pairs can be stored in a central unit (such as a Call Admission Control or CAC) from which all endpoints can request them. The use of such centralized services or pieces of knowledge (such as QoS, performance) offers the advantage that the performance requirements for the client or endpoint can be kept low. It is obvious, however, that an interface is required here between the ICE client and such a central QoS application.

In addition, a computer program or computer program product for executing the aforementioned method, and a machine-readable data carrier on which such a computer program is stored, are considered part of this invention.

The objective of the invention is also achieved with a telecommunication system having a first endpoint, a second endpoint (as well as multiple additional endpoints, normally), and an IP network through which the endpoints are connected to each other, wherein the endpoints are configured such that they are suitable for executing the described invented method.

The various aspects of the invention can be summarized as follows:
1. Expansion of the "STUN check" ICE procedure:
In addition to the parameters defined in RFC5389 (STUN), QoS-related data are inserted and later considered when prioritizing connection candidates.
2. Expansion of both endpoints so that they can determine QoS statistical data from earlier (or currently existing) connections and assign them to certain targets (target groups) and, if applicable, paths through the IP network. In addition, they are capable of "learning" statistical data from other endpoints.
3. Expansion of the first endpoint, such that
   a. its STUN client can insert QoS statistical data into the STUN request message,
   b. the STUN client can acquire QoS data from the STUN response message, in order to update or add to its own statistical data, and
   c. prioritization of the connection candidates, and with it the candidate selection, can be influenced based on self-determined data and on data received in b. above (from earlier checks).
4. Expansion of the second endpoint, such that
   a. its STUN client can acquire QoS data from the STUN request message, in order to update or add to its own statistical data, and
   b. its STUN server can insert its QoS statistical data into the STUN response message.
5. Optional expansion of network infrastructure elements (e.g., routers) so that they can insert their "QoS knowledge" (regarding current packet loss and packet drop for video traffic (video router queue), for example), into STUN messages.

Obviously, for this invention the invented method and the invented telecommunication system are closely interrelated. This means that features described with respect to the method can also be provided or required as part of the telecommunication system, and also, conversely, features and characteristics described with respect to the telecommunication system also apply to the method, even when this is not expressly stated.

Additional advantages, features, and characteristics of the present invention are presented in the following description of advantageous embodiments with reference to the drawing.

DESCRIPTION OF THE PREFERRED EMBODIMENTS

Figure 3:
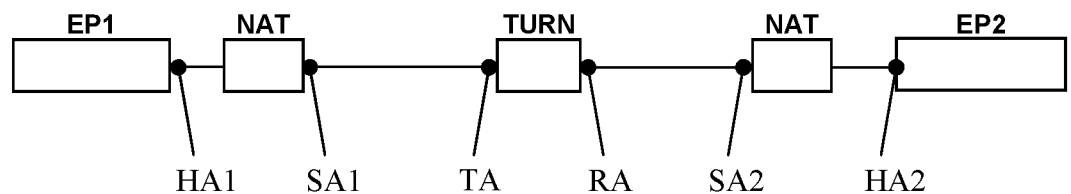
FIG. 3 is a diagram of yet another example configuration, in which the two endpoints have a connection to each other via NAT and TURN.
Figure 4:
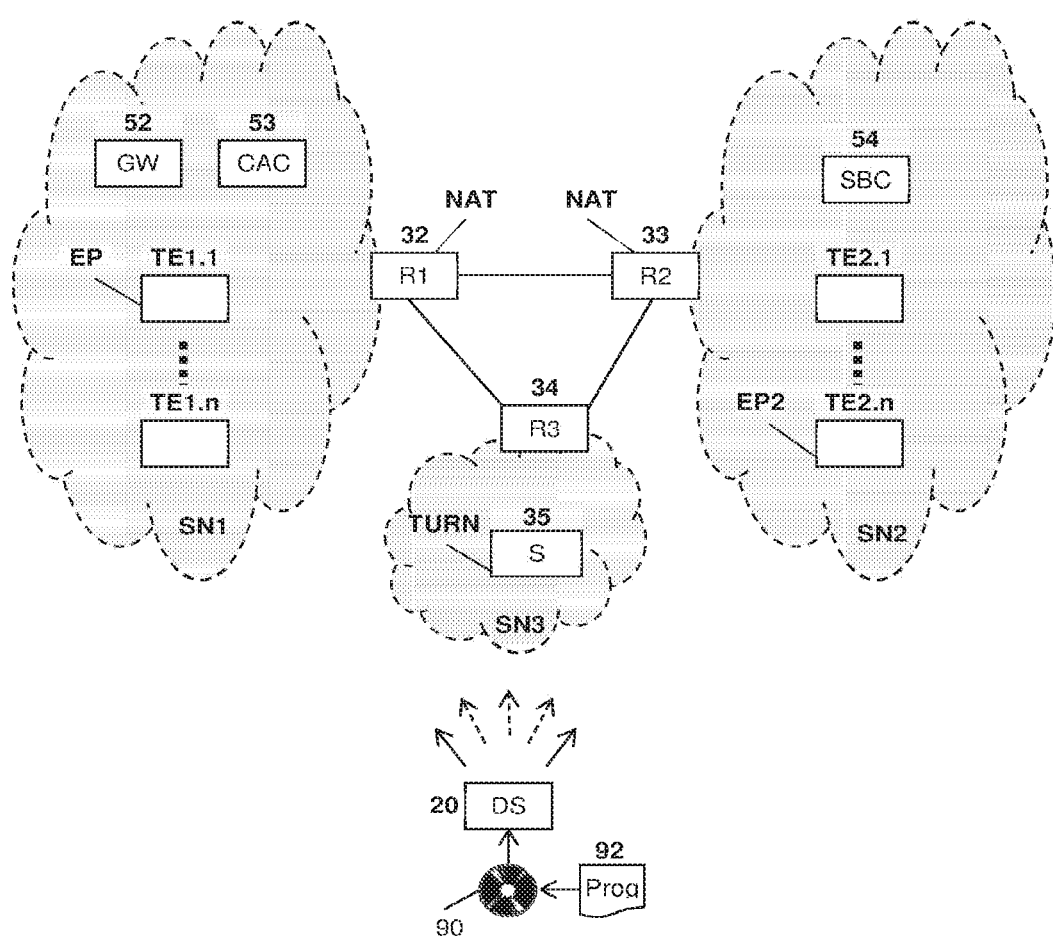
FIG. 4 is a diagram of a present preferred embodiment of the telecommunication system of the present invention.
Figure 5:
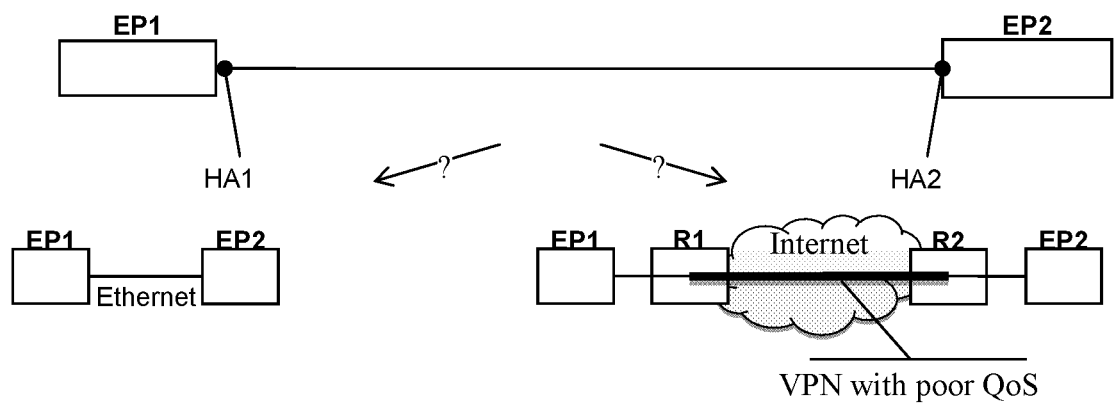
FIG. 5 is an illustration of two different network configurations with different physical characteristics but the same logical structure.

FIG. 4 shows an embodiment of an IP network-based telecommunication system according to the present invention in the example of multiple terminals TE1.1-TE1.$n$ (here, for example, located in a first subnet SN1) and TE2.1-TE2.$n$ (here, for example, located in a second subnet SN2). The illustrated endpoints EP1 and EP2 represent the endpoints of the connection shown in FIG. 3; they are connected to each other through both a NAT server and a TURN server (here, for example, located in a third subnet SN3). These servers are part of an IP network. The IP network also includes routers 32, 33, 34 or R1, R2, R3, a gateway 52, a CAC (Call Admission Control) instance 53 (running as software as a component of a VoIP switch, for example), an SBC (session-border controller) 54, an optional media server (not shown), and a software distribution unit 20, often also called a deployment service. It should be noted that other types of devices can also be used as endpoints for a connection (according to FIG. 1-FIG. 3), such as a gateway 52 or a SBC 54, for example. Implementation of the present method is decentral to all endpoints. A CD-ROM symbolically represents the data carrier 90 as the storage medium for a computer program 92 implementing the invented method, which can be loaded into the software distribution unit 20 for further distribution to the endpoints. The representation EP1-EP$n$ with no other specifications is used hereinafter for endpoints.

The term "terminal" implies physical equipment, i.e., both hardware devices—such as a (video) telephone, for example—and software applications representing the functions of these hardware devices, such as telephone clients, for example, or also WebRTC-based implementations of the various web browsers.

In FIG. 3 the respective assigned addresses for the various units are given, including the host addresses HA1, HA2 for the endpoints EP1 or EP2, the server-reflexive addresses SA1, SA2 for the NAT servers, the TURN server address TA on the endpoint EP1 side of the TURN server TURN, and the relayed address RA on the endpoint EP2 side of the TURN server TURN.

Figure 1:
FIG. 1 is a diagram of an example configuration in which two endpoints have a direct host-host connection to each other.
Figure 2:
FIG. 2 is a diagram of another example configuration, in which the two endpoints have a connection to each other via NAT.

FIGS. 1 and 2 show two other examples of the connection possibilities for both endpoints EP1 and EP2, including a NAT server NAT placed directly according to FIG. 1 and interposed according to FIG. 2, each with the corresponding addresses.

Current quality-of-service (QoS)-related data should be integrated with the STUN connectivity checks, in order to influence the aforementioned prioritization, if applicable, and thus finally select the connection that can provide a certain QoS level or quality-of-service value.

To do this, statistics are fed to endpoints EP1-EP$n$ that are used to predict the expected QoS levels for a particular connection.

The "QoS criteria" considered are, for example:
1. packet delay (end-to-end delay) between the two endpoints EP1-EP$n$
2. packet delay variance (jitter)
3. packet loss rate
4. likelihood of packet reordering Because the statistical values are to be used for predictions, it is not enough just to note these values; instead, the aforementioned values have to be stored by a connection partner or partner group, so that, if applicable, the selected connection path (i.e., which NAT and, if applicable, which TURN server was used) is also taken into account.

Organization of Statistical Data

Normally, during each connection, data on RTP (real-time protocol) connection quality are collected and transmitted to the communication partner via RTCP (real-time control protocol), for example. However, until now these data have normally been used only to monitor an ongoing connection or at the end of a connection for retroactive quality assessment.

According to one embodiment, each endpoint EP1-EPn stores these data and links them with the target and, if applicable, the path (via NAT and/or TURN), so that these data can be accessed before a new connection is established to the target, and if applicable via that path. This is done as follows: The data shown in FIGS. 1-4 are contained in the data for the ICE candidates. The following are also known:
- the host addresses ("BASE") for both partners
- the server-reflexive address(es) (depending on whether only one or both endpoints are located behind NAT)
- the TURN server and TURN relayed addresses (if TURN is involved).

Address and path groups for which the same QoS criteria apply are generated from these values.

It is not always helpful to maintain statistical data for every contacted partner-endpoint EP1-EPn (for which only the host addresses HA1 and HA2 for endpoints EP1 and EP2 are shown), since the resulting data volumes can become rather large. It is therefore possible to define groups of endpoints to which the same predictions may apply. Then data only need to be maintained by group. In this case, an IP subnet can be defined as such a group, because the paths through a network are generally defined at the subnet level in the routers. However, the host addresses that have been typically transmitted in prior systems do not contain any reference to the subnet. Here an expansion to the network suffix (e.g., "/24," IPv4 or IPv6) or the subnet mask (e.g., "255.255.2550," IPv4 only) is recommended in order to comprehensively solve this problem.

It is different for the NAT devices (server-reflexive addresses) and TURN servers (TURN server and relay addresses). There are comparatively few of these devices, which must be considered individually.

Depending on the connection scenario (see FIG. 1 to FIG. 3), the following endpoint/path groups with common QoS data result:
1. Subnet for partner-endpoint EP1-EPn (according to FIG. 1)
2. Subnet for partner-endpoint EP1-EPn+server-reflexive IP address (according to FIG. 2)
3. Subnet for partner-endpoint EP1-EPn+TURN server address/relayed address (according to FIG. 3)

Method Sequence

Whenever a new list of ICE candidates (the "checklist") is generated and sorted according to the known priorities, it is divided into three sub-lists:
A sub-list for candidates with a direct connection (according to FIG. 1)
A sub-list for candidates with a connection via NAT (according to FIG. 2)
A sub-list for candidates with a connection via TURN (according to FIG. 3)

For each candidate, the system checks to see whether statistical data already exist for that target (and, if applicable, the path). Because at endpoint EP1-EPn it is also known what type of connection is to be established (UDP (User Datagram Protocol), TCP (Transmission Control Protocol), Voice, Video, which codec, etc.), the QoS requirements for such a connection are also known.

If the QoS prediction for a candidate indicates that the required service cannot (sensibly) be provided via that path, that candidate is moved to the end of the checklist.

If the QoS prediction for a candidate indicates only a slight reduction in quality, that candidate is moved to the end of its sub-list (see above).

If the QoS prediction for a candidate expects no reduction or there are no QoS data, the sequence remains unchanged.

Because all of these processes operate within the endpoint EP1-EPn—without any outside communication—the work is done in fractions of seconds and only marginally affects processing time.

Now the actual STUN connectivity checks begin according to the newly sequenced checklist, whereby optimization methods described in the standard (under the keyword "foundations") can also be used here. However, because these optimization methods do not affect the invention itself, a detailed explanation of them is not necessary.

Since the process starts with the connection candidates for which the best QoS characteristics are expected within the various sub-lists, or whose QoS prediction is not possible due to lack of data, the best connection is expected to be found in the fewest possible attempts.

If (e.g., at the beginning) there are no statistical data, the prioritization described in the standard is unchanged; however, the endpoint EP1-EPn learns with each connection and can optimize the prioritization. It should be noted that the statistical data can only be used for predictions for a certain length of time. Therefore, after a preset length of time (timeout occurring after 30 seconds to a max. of a few minutes, for example), they should automatically be deleted if no additional connection to the same target or via the same path was established that allowed the data to be verified and, if applicable, updated.

Exemplary Embodiments

In ICE the roles are distributed asymmetrically; there is one "controlling" endpoint and there is one "controlled" endpoint. The way these roles are assigned is described in the standard and is of no significance here. However, it is important to know what these roles are, in order to understand what follows.

1. The controlling endpoint is determined as before in ICE.

The invented candidate prioritization and selection are internal processes in endpoint EP1, as in the following example according to FIG. 6. In endpoint EP2, for simplification, only the trigger for the check in the opposite direction is shown. The two STUN checks shown here represent a potentially long sequence of STUN checks (for each of the 40 ICE address candidates, for example).

The controlling endpoint EP1 performs the actions described above. The controlled endpoint EP2 remains passive until the first connectivity check comes through to it. It responds to it immediately and immediately triggers a connectivity check from its side in the opposite direction (called a "triggered check" in the standard), using the candidate that is already used unidirectionally as a recognized functioning candidate.

If this check in the opposite direction is also successful, that candidate is selected for the connection, and the controlling endpoint reports that back to the controlled endpoint with a STUN message (in which a specific flag is placed according to the standard). After that the media stream can flow.

Except for the altered priority sequence and previously described transmission of the subnet ID (suffix or mask) according to the invention, the process mentioned above corresponds to the standard.

Figure 6:
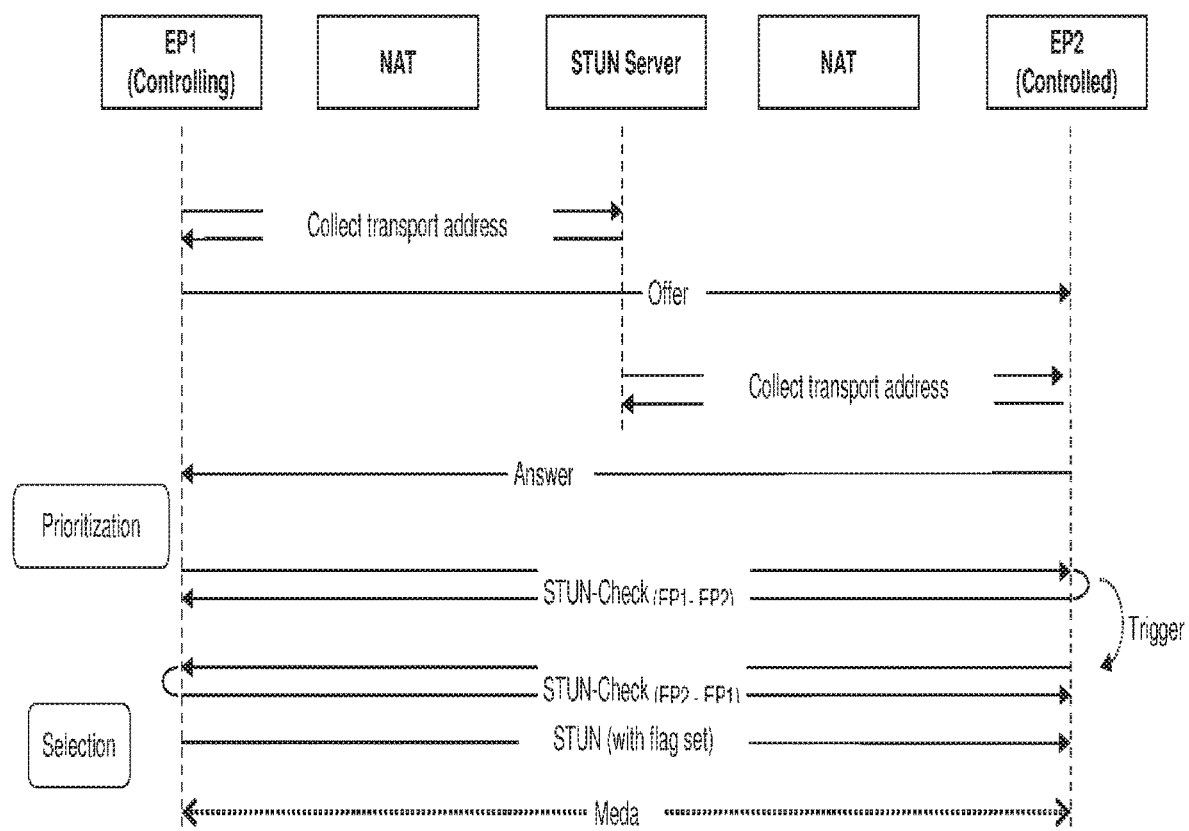
FIG. 6 is a flow diagram for a STUN connectivity check modified according to the invention.

It should be noted that the two STUN checks shown in FIG. 6 represent a possibly longer sequence of STUN checks (e.g., with n=40 for each of the 40 ICE address candidates).

2. The controlling endpoint is (if possible) placed on central points.

Deviating from the role assignment currently described in the standard, the controlling endpoint EP1-EPn is preferably placed on a central point (gateway, session-border controller, media server), as long as one is involved in establishing the current connection. Because there is a higher volume of traffic here, appropriate QoS data are more likely to be available. This is useful for central conferences, for example.

3. The known QoS data for a candidate are exchanged as part of the connectivity check.

This means that both sides have the same QoS knowledge and each one's QoS statistic is expanded by the knowledge of its partner-endpoint. This allows for more accurate predictions. However, this would also require an expansion of the STUN protocol.

4. The connectivity check results are considered in the QoS statistics.

Not only the data from prior or currently running connections, but also the results of the connectivity checks, are considered in the QoS statistics. An erroneous check would cause the QoS prediction to be downgraded. In this way, response wait-times for subsequent checks can be avoided (as a rule, an erroneous connectivity check is identified due to the fact that no answer was received before a timeout). However, this downgrading should first be applied only to one IP address and not the whole subnet, because the absence of an answer could also be caused by a defect in the partner-endpoint. If, however, in the shortest (to be defined) time (typically about 30 seconds), the connectivity checks of multiple partner-endpoints in the same subnet fail, then the QoS prediction for the entire subnet should be downgraded.

According to the invention, QoS statistics from the past influence the sequence of the STUN connectivity check activity (ICE candidate pairs) and thereby reduce the connection establishment time. In addition, QoS information in the STUN connectivity check messages is considered. In the case of STUN request and STUN response messages with QoS content (e.g., in the style of RTCP QoS message content), called "STUN QoS checks."

The following example should explain why optimizations are important for ICE: For an ICE voice endpoint A, with IPv4 and IPv6 for host, server-reflexive, and TURN relay addresses, there are already 6 possible receipt transport addresses (IP/Port) for voice (S)RTP payload. The same is true for the ICE endpoint B, for which in the example there are already 36 STUN connectivity checks to be performed. If this involves a video-enabled ICE endpoint, the number doubles. The same is true for screen sharing (if it is based on RTC video, as is the case for modern communication platforms, for example).

It should be noted that the features of the invention described by referencing the presented embodiments, for example the type and configuration of the individual network elements and steps for executing the method, especially for determining, storing, and distributing or using the quality-of-service values, can also be present in other embodiments, unless stated otherwise or prohibited for technical reasons. Not all features of individual embodiments described in combination must necessarily always be implemented in any one particular embodiment.

LIST OF REFERENCE CHARACTERS

20=Software distribution unit/Deployment Service (DS)
32=Router 1
33=Router 2
34=Router 3
35=TURN server (S)
52=Gateway (GW)
53=Central Instance/Call Admission Control (CAC)
54=Session-Border Controller (SBC)
90=Data carrier
92=Computer program (Prog)
EP1,2 . . . n-Endpoint 1,2 . . . n related to the described method
TE1.1 . . . TE1.$n$=Terminals (hardware devices or software clients) in the subnet 1
TE2.1 . . . TE2.$n$=Terminals (hardware devices or software clients) in the subnet 2
NAT=NAT server
HA1, HA2=Host addresses 1,2
RA=Relayed Address
R1, R2=Router 1,2
SA1, SA2=Server-reflexive addresses 1,2
SN1, SN2, SN3=Subnet 1, Subnet 2, Subnet 3
TA=TURN server address

What is claimed is:

1. A computer-implemented method of generating real-time connections, comprising:
   generating a list of possible connection paths between a first device and a second device;
   predicting a quality of service (QoS) value for each of the possible connection paths in the list;
   modifying the list using the QoS value to generate a modified list by listing the possible connection paths by a highest predicted QoS value;
   determining, based on the modified list, that a first possible connection path associated with the highest predicted QoS value is unavailable; and
   enabling a real-time connection between the first device and the second device, using a second possible connection path associated with a next highest predicted QoS value, based on the modified list.

2. The method of claim 1, wherein enabling the real-time connection comprises using a possible connection path associated with the highest predicted QoS value in the modified list.

3. The method of claim 1, wherein modifying the list using the QoS further comprises modifying the list using a previous QoS value from a previously established connection.

4. The method of claim 1, wherein predicting the QoS value for each of the possible connection paths comprises predicting using QoS values received from Session Traversal Utilities for Network Address Translation (STUN) connectivity check messages.

5. The method of claim 1, further comprising:
   defining groups for the first device or the second device; and
   wherein predicting the QoS value for each of the possible connection paths comprises predicting a group QoS value.

6. The method of claim 5, wherein the group QoS value is determined using a previously established connection or an existing connection.

7. A non-transitory, computer-readable medium storing instructions that, when executed by a processor, cause:
> generating a list of possible connection paths between a first device and a second device;
> predicting a quality of service (QoS) value for each of the possible connection paths in the list;
> modifying the list using the QoS value to generate a modified list by listing the possible connection paths by a highest predicted QoS value;
> determining, based on the modified list, that a first possible connection path associated with the highest predicted QoS value is unavailable; and
> enabling a real-time connection between the first device and the second device, using a second possible connection path associated with a next highest predicted QoS value, based on the modified list.

8. The non-transitory, computer-readable medium of claim 7, wherein enabling the real-time connection comprises using a possible connection path associated with the highest predicted QoS value in the modified list.

9. The non-transitory, computer-readable medium of claim 7, wherein modifying the list using the QoS further comprises modifying the list using a previous QoS value from a previously established connection.

10. The non-transitory, computer-readable medium of claim 7, wherein predicting the QoS value for each of the possible connection paths comprises predicting using QoS values received from Session Traversal Utilities for Network Address Translation (STUN) connectivity check messages.

11. The non-transitory, computer-readable medium of claim 7, storing further instructions that, when executed by the processor, cause:
> defining groups for the first device or the second device; and
> wherein predicting the QoS value for each of the possible connection paths comprises predicting a group QoS value.

12. The non-transitory, computer-readable medium of claim 11, wherein the group QoS value is determined using a previously established connection or an existing connection.

13. A system for generating real-time connections, comprising:
> one or more processors; and
> a memory operatively connected to the one or more processors and storing instructions that, when executed by the one or more processors, cause:
>> generating a list of possible connection paths between a first device and a second device;
>> predicting a quality of service (QoS) value for each of the possible connection paths in the list;
>> modifying the list using the QoS value to generate a modified list by listing the possible connection paths by a highest predicted QoS value;
>> determining, based on the modified list, that a first possible connection path associated with the highest predicted QoS value is unavailable; and
>> enabling a real-time connection between the first device and the second device, using a second possible connection path associated with a next highest predicted QoS value, based on the modified list.

14. The system of claim 13, wherein enabling the real-time connection comprises using a possible connection path associated with the highest predicted QoS value in the modified list.

15. The system of claim 13, wherein modifying the list using the QoS further comprises modifying the list using a previous QoS value from a previously established connection.

16. The system of claim 13, wherein the memory stores additional instructions that, when executed by the one or more processors, cause:
> defining groups for the first device or the second device; and
> wherein predicting the QoS value for each of the possible connection paths comprises predicting a group QoS value.

17. The system of claim 13, wherein the group QoS value is determined using a previously established connection or an existing connection.

* * * * *